Patented May 6, 1947

2,419,976

UNITED STATES PATENT OFFICE 2,419,976

PREPARATION OF DINITROSOBENZENES

Joseph H. Trepagnier, Wilmington, Del., and John V. Vaughen, Woodstown, N. J., assignors to E. I. du Pont de Nemours & Company, Wilmington, Del., a corporation of Delaware No Drawing. Application August 11, 1945, Serial No. 610,400

2 Claims. (Cl. 260—647)

This invention relates to an improvement in the process for preparing para-dinitrosobenzenes.

Para-dinitrosobenzene and its homologs have been found to be of real value in the vulcanization of rubber-like materials. In co-pending applications Serial No. 519,190 filed January 21, 1944, and Serial Nos. 554,534 and 554,535 both filed September 16, 1944, the use and advantages of these compounds in the vulcanization of butyl rubber, 2-chlorobutadiene-1,3 polymers and copolymers, and butadiene-1,3-hydrocarbon polymers and copolymers, is described.

Heretofore, para-dinitrosobenzenes have been prepared by oxidizing para-quinone dioxime with potassium ferricyanide in an alkaline solution. Because of the high molecular weight of potassium ferricyanide and because two mols are required to oxidize one mol of para-quinone dioxime, a comparatively large amount of the ferricyanide is required to carry out the reaction. For example, 658 parts of potassium ferricyanide are required to oxidize 138 parts of para-quinone dioxime to the para-dinitrosobenzene. Aside from the cost, the process presents other disadvantages, particularly when the product is to be used in vulcanizing elastomers. The removal of the large amount of ferrocyanide formed in the reaction is quite difficult, for the para-dinitrosobenzene comes down in a finely divided state with which the ferrocyanide becomes occluded. Consequently, large volumes of water and a considerable time are required to remove this impurity. The removal of the ferrocyanide is important, because, like other ionic material, it has a deleterious effect on the electrical insulation properties of the polymer vulcanizates. It is also extremely important to remove ferrocyanide because it is a well known oxidation catalyst and may markedly decrease the resistance of the polymer to aging.

Para-dinitrosobenzenes probably exist in polymeric or associated form [see Bigiavi and Franceschi, Gazzetta chimica italiana 57, 362 (1927) and Ruggli and Petitjean, Helvetica Chimica Acta 21, 711 (1938)]. For this reason, the chemical reactivity of the dinitrosobenzenes varies with the mode of preparation of the sample. For example, Ruggli and Petitjean have prepared samples of para-dinitrosobenzene which react almost quantitatively with aniline, whereas other samples did not react at all. Similar differences have been found in the reactivity of the para-dinitrosobenzenes in the vulcanization of rubber-like materials. A considerably larger amount of a dinitrosobenzene of low reactivity is required to produce a given effect in the vulcanization of elastomers than is required of one having high reactivity. Such differences cannot be accounted for by simple analytical determinations, as both active and unactive samples have essentially the same elementary analysis. The actual chemical differences in the product are not known, but it is possible that the difference in reactivity may be due to differences in structure and degree of polymerization.

The object of this invention is to provide a new and improved process for preparing para-dinitrosobenzene and its homologs. A further object of the invention is to provide a simple and economical process for producing para-dinitrosobenzenes having high reactivity in the vulcanization of elastomers, and one which gives the para-dinitrosobenzenes in good yields.

We have found that para-dinitrosobenzene and its homologs, having high activity in the vulcanization of elastomers, can be prepared in good yields by oxidizing an alkaline solution of the corresponding quinone dioxime with about one mol of an alkali metal hypochlorite or an alkali metal hypobromite per mol of dioxime, where the reaction is carried out at relatively low temperatures so that no substantial amount of the dinitroso-compound is oxidized to the dinitro-compound.

By using the hypohalites instead of potassium ferricyanide, considerably less oxidizing agent is required to give high yields of the dinitrosobenzenes. For example, only 74.5 parts of sodium hypochlorite are required to oxidize 138 parts of para-quinone dioxime, whereas 658 parts of potassium ferricyanide are required. Consequently, a correspondingly smaller amount of electrolyte has to be washed or otherwise removed from the product.

The oxidation of para-quinone dioxime with sodium hypochlorite is disclosed by Ponzio [Gazzetta chimica italiana 36, II, 101 (1906), Beilstein Fourth Edition, vol. VII, page 628], but in that process Ponzio obtained a quantitative conversion of the para-quinone dioxime to para-dinitrobenzene. While Ponzio considered that it was probable that in the reaction the para-dinitrosobenzene which Nietzki and Kehrmann [Berichte 21, 429 (1888)] had obtained was first formed, it was recognized that the para-dinitrosobenzene was very easily oxidized. From this disclosure, it was considered that, if the para-dinitrosobenzene was formed, the sodium hypochlorite was such a strong oxidizing agent that it was immediately oxidized to the dinitrobenzene.

We have found, by repeating the process of Ponzio, that a substantially quantitative yield of para-dinitrobenzene is obtained, and that this material has no reactivity whatsoever in the vulcanization of elastomers, such as GR–S, under the conditions hereinafter set forth in testing the reactivity of the dinitrosobenzenes of this invention.

Since the ordinary criteria of purity, such as melting point, elementary analysis, etc., cannot be applied to the dinitrosobenzene compounds to distinguish those which have been found to be active in the vulcanization of elastomers from those which are not, a comparison of the products produced under the various conditions of our invention will be made, based on their vulcanization reactivity. Although the vulcanization reactivity can be determined in any of the various elastomers, the comparisons made in this description have been based on the reactivity of the dinitrosobenzenes in the vulcanization of the butadiene-styrene elastomer, generally known in this country as "GR–S," which is obtained by emulsion polymerization of 75 parts of butadiene and 25 parts of styrene. This was convenient because it was found that the stress at 300% elongation of GR–S vulcanizates obtained with para-dinitrosobenzene varied almost linearly with the proportion of para-dinitrosobenzene used.

The following examples illustrate the preferred procedure for producing the para-dinitrosobenzenes according to our invention. The parts used are by weight.

EXAMPLE 1

An alkaline solution of para-quinone dioxime was produced by stirring together a mixture of 250 parts of water, 41.4 parts of para-quinone dioxime and 78 parts of a 30% sodium hydroxide solution. Sufficient water was then added to bring the total mass to 400 parts. This solution was cooled to −5° C. and added to 400 parts of an aqueous solution of sodium hypochlorite containing 22.5 parts of sodium hypochlorite under agitation, the sodium hypochlorite solution also being cooled to −5° C. The mixture was then stirred for 15 minutes and filtered. The resulting product was washed alkaline-free with water and dried at 65° C. over night. The resulting para-dinitrosobenzene, which showed a high activity in the vulcanization of synthetic elastomers, was obtained in a yield of 86% of theory.

To illustrate the effect of para-dinitrosobenzene on the modulus of GR–S vulcanizates, the data of Table I were obtained, using the above prepared sample. In securing these data, the amounts of para-dinitrosobenzene given in the table were incorporated in 150 parts of a base stock containing, by weight:

| | Parts |
|---|---|
| GR–S | 100 |
| Medium processing Channel Black | 50 | and the stocks were cured for 30 minutes at 307° F.

Table I

| Parts of para-Dinitrosobenzene Incorporated in Base Stock | Stress at 300% Elongation, p. s. i. |
|---|---|
| 0.30 | 225 |
| 0.45 | 340 |
| 0.60 | 440 |
| 0.75 | 625 |
| 0.90 | 700 |

As previously stated, these data show that the stress at 300% elongation varies almost linearly with the proportion of para-dinitrosobenzene used; consequently, the vulcanization activity of two samples of para-dinitrosobenzene can be compared readily by comparing the effect of equal quantities of the samples on the stress at 300% elongation of GR–S vulcanizates.

Using this method, it was found that the sample of para-dinitrosobenzene prepared above had high vulcanization activity; in fact, no other preparation which we were able to produce showed higher activity. For this reason, it was chosen as a standard.

In this example and the following examples, the percent of activity is based on a comparison of the stresses at 300% elongation of the vulcanizates obtained in each case with a sample of the product obtained with the para-dinitrosobenzene of Example 1. For example, if the stress at 300% elongation obtained with 0.75 part of the sample of the para-dinitrosobenzene was found to be equal to that obtained with 0.6 part of the standard (the product of Example 1), the relative vulcanization activity would be 80%.

The following table shows the activity of two other samples of para-dinitrosobenzene produced in the same manner as described in Example 1, but in which the temperature of the solutions was held at the temperature indicated in the table. The activity of these products is compared with that of the product obtained in Example 1.

Table II

| Initial Temperature of Solutions | Yield in per cent of Theory | Relative Vulcanization Activity in GR–S |
|---|---|---|
| | | Per cent |
| −5° C | 86 | 100 |
| 0° C | 81 | 100 |
| 40° C | 90 | 95 |

EXAMPLE 2

A solution of paraquinone dioxime was prepared from 32 parts of para-quinone dioxime, 488 parts of water and 56 parts of 30% sodium hydroxide solution. This solution was cooled to 18° C., and 140 parts of a 12.59% solution of sodium hypochlorite added over one hour, maintaining a temperature of 18° C. The reaction mixture was stirred for one-half hour, filtered, and the product washed free of alkali. A 91% yield of para-dinitrosobenzene, having a relative vulcanization activity in GR–S of 100%, was obtained.

EXAMPLE 3

A solution of para-quinone dioxime was prepared from 41.4 parts of para-quinone dioxime, 78 parts of 30% sodium hydroxide solution and 200 parts of water. This solution and 165 parts of a 14.23% sodium hypochlorite solution were added simultaneously to 200 parts of water over one hour while stirring. A temperature of 15° C. and an excess of sodium hypochlorite, as indicated on potassium iodide-starch papers, was maintained during the reaction. After the reactants had been added, the mixture was stirred an additional 10 minutes, filtered, and the product washed free of alkali. In this manner, an 82% yield of para-dinitrosobenzene, having a relative vulcanization activity of 100%, was obtained.

By reacting the para-quinone dioxime solution with the sodium hypochlorite solution in the manner illustrated in this example, the resulting para-dinitrosobenzene is obtained in a form which filters and washes readily.

EXAMPLE 4

The reaction can also be carried out by generating the alkali metal hypohalite in situ. This can be carried out by adding chlorine or bromine to the alkaline reaction mixture. The following process illustrates the procedure.

A solution of 6.7 parts of sodium carbonate in 300 parts of water was prepared. This solution was stirred while chlorine was passed in, until a pH of approximately 8.5 was reached. A solution of para-quinone dioxime, prepared from 41.4 parts of para-quinone dioxime, 87.5 parts of 30% sodium hydroxide solution and 430 parts of water, was added over one hour to the previously prepared sodium carbonate solution while adding chlorine at the rate necessary to maintain a pH of 8.5 to 9.0. The temperature of the reaction mixture was maintained at 10° C. Sufficient 30% sodium hydroxide solution to make the reaction mixture distinctly alkaline to Clayton Yellow paper was then added. Isolation of the product was carried out by the method used in the previous examples. An 82% yield of para-dinitrosobenzene, having a vulcanization activity of 100%, was obtained.

EXAMPLE 5

An alkaline solution of para-quinone dioxime was prepared by mixing 27.6 parts of para-quinone dioxime, 150 parts of water and 20 parts of potassium hydroxide. This was cooled to 10° C. and added, while stirring, to 340 parts of potassium hypobromite solution containing 30 parts of potassium hypobromite which was also cooled to 10° C. The product was isolated as in the previous examples. A yield of 92% of theory was obtained, with a relative vulcanization activity of 100%.

EXAMPLE 6

A solution of 9 parts of 2-methyl-para-quinone dioxime, 60 parts of water and 16 parts of 30% sodium hydroxide solution was cooled to 10° C. and added, while stirring, to a solution of 90 parts of 5% sodium hypochlorite solution which was also cooled to 10° C. After stirring 5 minutes, the product was isolated as in the previous examples. In this manner a yield of 68% of 2-methyl-para-dinitrosobenzene was obtained which had a vulcanization activity equal to that of a standard sample of para-dinitrosobenzene.

This process is particularly applicable in the preparation of para-dinitrosobenzene and its lower molecular weight homologs in which the alkyl groups, attached to the benzene nucleus, carry from 1 to 6 carbon atoms, such as 2-ethyl-1,4-dinitrosobenzene, 2,3,5-trimethyl-1,4-dinitrosobenzene, 2-methyl-5-isopropyl-1,4-dinitrosobenzene and 2-n-amyl-1,4-dinitrosobenzene, which class broadly has the formula:

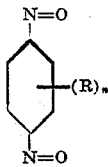

wherein R stands for an alkyl group of from 1 to 6 carbon atoms and $n$ stands for a whole number from 0 to 3.

The oxidation of the para-quinone dioxime with the hypohalite may be conveniently carried out at temperatures of from −5° C. to 50° C. Although the reaction takes place almost instantaneously even at low temperatures, and can be operated successfully at temperatures near the freezing point of the mixture, there is little or no advantage in operating below 0° C.

If the sodium hypochlorite is added slowly to the quinone dioxime solution, the temperature should be maintained below about 25° C. to produce good yields of para-dinitroso-benzene having high reactivity. However, if the conditions of the reaction are arranged so that all of the quinone dioxime is rapidly consumed (for example, by adding the quinone dioxime solution rapidly to the hypochlorite solution), good yields can be obtained at much higher temperatures. The oxidation, however, is preferably carried out at temperatures not above 50° C.

The hypohalites which are particularly useful in this reaction are sodium hypochlorite, sodium hypobromite, potassium hypochlorite and potassium hypobromite.

The preferred amount of hypohalite used is about one mol per mol of para-quinone dioxime to be oxidized. If appreciably less than one mol of hypohalite is used, low yields are obtained. However, as much as 1.5 mols can usually be employed without deleterious effects, particularly at low temperatures.

Since the reaction takes place almost instantly, it is possible to carry it out in equipment which provides only short reaction times, such as in a turbulent flow tube.

This invention provides a simple and economical process for preparing para-dinitrosobenzenes which have high vulcanization activities in good yields. The process eliminates the use of the large amount of more expensive potassium ferricyanide heretofore employed for this purpose, as well as the possible contamination of the resulting product with potassium ferrocyanide, potentially harmful in the use of the resulting products in the vulcanization of elastomers.

We claim:
1. A process for preparing para-dinitrosobenzenes which comprises oxidizing a para-quinone dioxime in alkaline solution with approximately one mol of alkali metal hypohalite per mol of para-quinone dioxime at temperatures of from −5° to 50° C.

2. A process for preparing para-dinitrosobenzene which comprises dissolving para-quinone dioxime in an aqueous sodium hydroxide solution, and mixing this aqueous hydroxide solution of the para-quinone dioxime with an aqueous solution of sodium hypochlorite to effect oxidation of the para-quinone dioxime, the reaction being carried out at temperatures of from −5° to 50° C., substantially one mol of sodium hypochlorite being employed per mol of para-quinone dioxime.

JOSEPH H. TREPAGNIER.
JOHN V. VAUGHEN.

REFERENCES CITED

The following references are of record in the file of this patent:

Ponzio Gazetta Chimica Italiana, vol. 36, II (1906), p. 104, p. 105.